US012620842B2

(12) United States Patent
Wu et al.

(10) Patent No.: US 12,620,842 B2
(45) Date of Patent: May 5, 2026

(54) STATOR ASSEMBLY AND MOTOR

(71) Applicants:GUANGDONG WELLING MOTOR MANUFACTURING CO., LTD., Foshan (CN); MIDEA WELLING MOTOR TECHNOLOGY (SHANGHAI) CO., LTD., Shanghai (CN)

(72) Inventors: Di Wu, Foshan (CN); Guyu Wu, Foshan (CN); Yiming Hu, Foshan (CN); Liming Gong, Foshan (CN); Ping Li, Foshan (CN)

(73) Assignees: GUANGDONG WELLING MOTOR MANUFACTURING CO., LTD., Foshan (CN); MIDEA WELLING MOTOR TECHNOLOGY (SHANGHAI) CO., LTD., Shanghai (CN)

( * ) Notice: Subject to any disclaimer, the term of this patent is extended or adjusted under 35 U.S.C. 154(b) by 707 days.

(21) Appl. No.: 17/512,927

(22) Filed: Oct. 28, 2021

(65) Prior Publication Data

US 2022/0060065 A1 Feb. 24, 2022

Related U.S. Application Data

(63) Continuation of application No. PCT/CN2019/114159, filed on Oct. 29, 2019.

(30) Foreign Application Priority Data

Apr. 29, 2019 (CN) .......................... 201910356995.8
Apr. 29, 2019 (CN) .......................... 201920608027.7

(51) Int. Cl.
        *H02K 1/14*         (2006.01)
        *H02K 1/18*         (2006.01)
        *H02K 16/02*        (2006.01)

(52) U.S. Cl.
        CPC ............. *H02K 1/146* (2013.01); *H02K 1/182* (2013.01); *H02K 16/02* (2013.01)

(58) Field of Classification Search
        CPC ........... H02K 1/182; H02K 1/146–148; H02K 37/125

(Continued)

(56) References Cited

U.S. PATENT DOCUMENTS

2010/0225195 A1* 9/2010 Asano ...................... H02K 1/02
                                                                310/216.067
2011/0187222 A1 8/2011 Li et al.
2017/0256695 A1 9/2017 Lam et al.

FOREIGN PATENT DOCUMENTS

CN          1596495 A       3/2005
CN      101505080 A  *  8/2009  .............. F04B 39/00
                        (Continued)

OTHER PUBLICATIONS

Machine translation of CN-101505080-A (Year: 2009).*
                        (Continued)

*Primary Examiner* — Oluseye Iwarere
*Assistant Examiner* — Minki Chang
(74) *Attorney, Agent, or Firm* — Scully, Scott, Murphy & Presser, P.C.

(57) ABSTRACT

A stator assembly and a motor are provided. The stator assembly has a stator core and a winding. The stator core has a stator yoke portion, at least one stator tooth, and at least one winding. The stator tooth is disposed along the axial direction of the stator yoke portion. The stator tooth is detachably connected to the stator yoke portion. The winding is wound on the stator tooth. The stator yoke portion is provided with a stator yoke groove and/or a stator projection adapted to the shape of the stator tooth. The stator tooth (Continued)

passes through the stator yoke groove and/or the stator projection to form the stator core.

16 Claims, 8 Drawing Sheets

(58) Field of Classification Search
USPC .......................................... 310/49.42, 156.32
See application file for complete search history.

(56) References Cited

FOREIGN PATENT DOCUMENTS

| | | | | |
|----|------------|-----|---------|----------------|
| CN | 106505755 | A | 3/2017 | |
| CN | 106712326 | A | 5/2017 | |
| CN | 109302027 | A | 2/2019 | |
| CN | 208571732 | U | 3/2019 | |
| CN | 209497335 | U | 10/2019 | |
| DE | 102012022868 | A1 * | 5/2014 | ............. H02K 1/148 |
| JP | 2006025486 | A | 1/2006 | |
| JP | 2008228363 | A * | 9/2008 | |
| WO | WO-03047070 | A1 * | 6/2003 | ............. H02K 1/148 |
| WO | 2018180720 | A1 | 10/2018 | |

OTHER PUBLICATIONS

Machine translation of JP-2008228363-A (Year: 2008).*
Machine translation of DE-102012022868-A1 (Year: 2012).*
Machine translation of WO-03047070-A1 (Year: 2003).*
International Search Report dated Feb. 6, 2020 received in International Application No. PCT/CN2019/114159 together with an English language translation.
Office Action dated Oct. 27, 2023 received in European patent Application No. EP 19927184.2.
Extended European Search Report dated Apr. 20, 2022 received in European Patent Application No. EP 19927184.2.
First Office Action dated Nov. 15, 2024 in Application No. 201910356995.8 from State Intellectual Property Office of People's Republic of China together with an English language translation.
Office Action dated Oct. 29, 2025 received in European Patent Application No. 19927184.2.

* cited by examiner

STATOR ASSEMBLY AND MOTOR

CROSS-REFERENCE TO RELATED APPLICATIONS

The present application is a continuation application of PCT International Application No. PCT/CN2019/114159, filed on Oct. 29, 2019, which claims priority to and benefits of Chinese Patent Application No. 201910356995.8 filed with China National Intellectual Property Administration on Apr. 29, 2019 and entitled "STATOR ASSEMBLY AND MOTOR", and Chinese Patent Application No. 201920608027.7 filed with China National Intellectual Property Administration on Apr. 29, 2019 and entitled "STATOR ASSEMBLY AND MOTOR". The entire content of each of Chinese Patent Application No. 201910356995.8 and Chinese Patent Application No. 201920608027.7 is incorporated herein by reference for all purposes. No new matter has been introduced.

FIELD

The present disclosure relates to the technical field of motors, and particularly relates to a stator assembly and a motor comprising the stator assembly.

BACKGROUND

At present, in the prior art, when winding is performed on a motor, since the size of the winding grooves for winding is relatively fixed, the power level of the stator core is limited, and before each implementation of winding, the corresponding operation power has been set, which greatly affects the expansion of the product, and also affects the winding efficiency due to the single winding mode.

SUMMARY

In order to solve at least one of the above technical problems, an object of the present disclosure is to provide a stator assembly.

Another object of the present disclosure is to provide a motor comprising the stator assembly.

In order to achieve the above objects, the embodiment of the first aspect of the present disclosure provides a stator assembly, comprising: a stator core and at least one winding, wherein the stator core comprises: a stator yoke portion; and at least one stator tooth, each of the stator teeth being disposed in an axial direction of the stator yoke portion, and the stator tooth being detachably connected to the stator yoke portion, and the at least one winding being wound on the at least one stator tooth, wherein the stator yoke portion is provided with a stator yoke groove and/or a stator protrusion adapted to the shape of the stator tooth, and the stator tooth passes through the stator yoke groove and/or the stator protrusion to form the stator core.

The stator assembly provided by the embodiment of the first aspect of the present disclosure comprises a stator core comprising a stator yoke portion, at least one stator tooth and at least one winding. That is, the number of the stator teeth and the number of the windings may both be one or more. By disposing each of the stator teeth in the axial direction of the stator yoke portion and detachably connecting each of the stator teeth to the stator yoke portion, the winding is not limited by the shape of the stator core when wound, and each of the stator teeth can be connected to the stator yoke portion after the winding has been wound. The winding mode is flexible and adaptable, and the winding efficiency of the winding is improved. In addition, by reasonably arranging the size of the stator teeth or the spacing between the stator teeth so as to adjust the size of the winding grooves, the number of the windings can be flexibly and adaptively set, such that the power level of the stator core can be reasonably adjusted, which solves the problem in the prior art that the power level of the stator core is limited due to the single size of the winding grooves. Moreover, at the time of assembling the stator tooth and the stator yoke portion, each of the stator teeth is directly passed through a stator yoke groove adapted to the shape of the stator tooth or the stator tooth is engaged with the stator protrusion; and even part of a plurality of stator teeth may be disposed to pass through the stator yoke groove, and the remaining stator teeth are engaged with the stator protrusion. Any of the above manners can achieve quick assembly of the stator teeth and the stator yoke portion, which effectively improves the assembling efficiency of the stator teeth and the stator yoke portion.

Materials of the stator tooth and the stator yoke portion are optionally magnetically conductive materials, such as silicon steel sheets, soft magnetic materials, or solid steel, which all can achieve the objects of the present disclosure, and therefore should all be within the protection scope of the present disclosure.

It should be noted that there may be a plurality of windings, and the shapes of wire wraps between the plurality of windings may be the same or different.

In addition, the stator assembly in the above embodiment provided by the present disclosure may also have the following additional technical features:

In the above embodiment, the stator yoke portion comprises: a plurality of first magnetically conductive sheets stacked in a radial direction or an axial direction of the stator core.

The stator yoke portion comprises a plurality of first magnetically conductive sheets, and the stator yoke portion is formed by stacking the plurality of first magnetically conductive sheets in the radial direction or the axial direction of the stator core, thereby improving the magnetic conductivity of the stator core. For example, the stacking direction of the first magnetically conductive sheets may be the radial direction or the axial direction, which may be flexibly and adaptively adjusted according to the specific use scenarios and processing requirements.

In the above embodiment, the stator yoke groove at least passes through one end surface of the stator yoke portion in the axial direction.

The stator yoke groove may pass through one end surface of the stator yoke portion in the axial direction, and may also pass through two end surfaces of the stator yoke portion in the axial direction. That is, the stator tooth may be inserted in a stator yoke groove passing through one end surface of the stator yoke portion, and may also be inserted in a stator yoke groove passing through two end surfaces of the stator yoke portion, so that the stator tooth and the stator yoke portion can be connected in various ways, and the winding can be assembled in a relatively flexible and adaptable way, so as to meet the different requirements of the users.

In the above embodiment, the stator yoke groove is spaced apart from an outer circumferential surface of the stator yoke portion in the radial direction, and the stator yoke groove is spaced apart from an inner circumferential surface of the stator yoke portion in the radial direction; or the stator yoke groove communicates with the outer circumferential surface and/or the inner circumferential surface of the stator yoke portion.

The stator yoke groove is spaced apart from the outer circumferential surface of the stator yoke portion in the radial direction, i.e., the stator yoke groove passes through the stator yoke portion and does not communicate with the outer circumferential surface of the stator yoke portion, then the stator tooth is inserted into the stator yoke groove in the axial direction of the stator yoke portion to be connected with the stator yoke portion, which prevents the stator tooth from being separated from the stator yoke portion from the stator yoke groove along the outer circumferential surface or the inner circumferential surface of the stator yoke portion, and improves connection reliability between the stator tooth and the stator yoke portion.

The stator yoke groove communicates with the outer circumferential surface or the inner circumferential surface of the stator yoke portion, then the stator tooth can be inserted into the stator yoke groove from the outer circumferential surface or the inner circumferential surface of the stator yoke portion. The connection mode is flexible and adaptable, which facilitates the assembly between the stator tooth and the stator yoke portion.

The stator yoke groove communicates with the outer circumferential surface and the inner circumferential surface of the stator yoke portion at the same time, then the stator tooth can be inserted into the stator yoke groove from the outer circumferential surface in the axial direction or the radial direction to form a complete stator core.

In the above embodiment, the stator yoke portion comprises: a plurality of first magnetically conductive sheets stacked in the radial direction or the axial direction of the stator core; and the stator tooth comprises: a stator tooth body, comprising a plurality of second magnetically conductive sheets stacked in the radial direction or a circumferential direction of the stator core.

The stator yoke portion comprises a plurality of first magnetically conductive sheets, and the stator yoke portion is formed by stacking the plurality of first magnetically conductive sheets in the radial direction or the axial direction of the stator core, thereby improving the magnetic conductivity of the stator core. For example, the stacking direction of the first magnetically conductive sheets may be the radial direction or the axial direction, which may be flexibly and adaptively adjusted according to the specific use scenarios and processing requirements.

The stator tooth comprises a stator tooth body and a tooth shoe, the stator tooth body comprises a plurality of second magnetically conductive sheets, the plurality of second magnetically conductive sheets are stacked in the radial direction or the circumferential direction of the stator core, and by this stacking manner, the magnetic conductivity of the stator core is improved without affecting the normal use of the stator tooth body.

It can be understood that the stacking direction of the first magnetically conductive sheets may be the radial direction or the axial direction, and the stacking direction of the second magnetically conductive sheets may be the radial direction or the circumferential direction; the stacking directions of the two kinds of magnetically conductive sheets can be set relatively independently, and the stacking direction can be flexibly and adaptively selected according to the actual application scenario.

For example, the first magnetically conductive sheets and the second magnetically conductive sheets both can be stacked in the radial direction; or the first magnetically conductive sheets can be stacked in the radial direction and the second magnetically conductive sheets are stacked in the circumferential direction; or the first magnetically conductive sheets can be stacked in the axial direction, and the second magnetically conductive sheets are stacked in the radial direction.

In the above embodiment, optionally, the stacking direction of the second magnetically conductive sheets is perpendicular to the stacking direction of the first magnetically conductive sheets.

By making the stacking directions of the first magnetically conductive sheets and the second magnetically conductive sheets perpendicular to each other, the magnetic conductivity of the stator core is further improved.

In the above embodiment, a stator tooth shoe is further comprised, which is disposed at an end portion of the stator tooth body and is detachably connected with the stator tooth body.

The stator tooth shoe is disposed at an end portion of the stator tooth body, and by detachably connecting the stator tooth shoe with the stator tooth body, the stator tooth shoe is connected with the stator tooth body after the winding has been wound on the stator tooth body, which serves the function of fixing the winding to prevent the winding from being separated from the stator tooth body, and further improves the assembly efficiency of the winding and the stator tooth.

It is worth noting that the materials of the stator tooth body and the stator tooth shoe may be the same or different.

In the above embodiment, the stator tooth shoe and the stator tooth body are integrally formed.

The stator tooth shoe and the stator tooth body are integrally formed, which simplifies the structure of the product, achieves better integrity of the product, omits the step of connecting the stator tooth shoe and the stator tooth body, and further improves the assembly efficiency of the product.

In the above embodiment, the number of the stator tooth shoes is one, and the stator tooth shoe is disposed at one end of the stator tooth body; or the number of the stator tooth shoes is two, and the two ends of the stator tooth body are provided with one of the stator tooth shoes respectively.

In this embodiment, the number of the stator tooth shoes arranged on each of the stator tooth bodies can be adjusted according to actual requirements. For example, one stator tooth body may be provided with one stator tooth shoe, or with two stator tooth shoes.

It should be noted that the two stator tooth shoes may be respectively arranged on the end surfaces of the stator tooth body.

In the above embodiment, the stator assembly further comprises: a positioning groove and a positioning convex rib having mated shapes, wherein one of the positioning groove and the positioning convex rib is disposed on the stator tooth, and the other is disposed on the stator yoke groove and/or the stator protrusion, so as to limit the position of the stator tooth in the stator yoke portion.

By arranging a positioning convex rib on the stator tooth and arranging a positioning groove on the stator yoke groove or the stator protrusion, or arranging a positioning groove on both the stator yoke groove and the stator protrusion, at the time of assembling the stator tooth and the stator yoke portion, the positioning convex rib is inserted into the positioning groove to serve the function of position limiting, thereby preventing relative movement between the stator tooth and the stator yoke groove, and further improving the stability of the connection between the stator tooth and the stator yoke groove.

Similarly, it is also feasible to arrange a positioning groove on the stator tooth, arrange a positioning convex rib on the stator yoke groove or the stator protrusion, or arrange a positioning convex rib on both the stator yoke groove and the stator protrusion. At the time of assembling the stator tooth and the stator yoke portion, the positioning convex rib is inserted into the positioning groove to serve the function of position limiting, thereby preventing relative movement between the stator tooth and the stator yoke portion, and further improving the stability of the connection between the stator tooth and the stator yoke portion.

In the above embodiment, the stator assembly further comprises: a mating groove and a mating convex rib having mated shapes, wherein one of the mating groove and the mating convex rib is disposed on the stator tooth body, and the other is disposed on the stator tooth shoe, so as to realize the connection between the stator tooth shoe and the stator tooth body through the mating between the mating groove and the mating convex rib.

By arranging a mating convex rib on the stator tooth body and arranging a mating groove on the stator tooth shoe, at the time of assembling the stator tooth shoe and the stator tooth body, the mating convex rib is directly inserted into the mating groove to limit the relative movement between the stator tooth shoe and the stator tooth body, which improves the assembly efficiency of the stator tooth shoe and the stator tooth body, and improves the stability of the connection between the stator tooth shoe and the stator tooth body.

In the above embodiment, the number of the stator yoke grooves is plural, and the plurality of stator yoke grooves are uniformly arranged on the stator yoke portion around the axis of the stator core.

The number of the stator yoke grooves is plural, and by uniformly arranging the plurality of stator yoke grooves on the stator yoke portion around the axis of the stator core, the structure of the product is more regular, and the number of the stator yoke grooves is increased; and correspondingly, the number of the stator teeth is also plural, and the plurality of stator teeth are inserted into the corresponding plurality of stator yoke grooves, thereby increasing the number of the windings, thus contributing to the improvement of the power level of the stator core.

In the above embodiment, a cross-sectional area of the stator yoke portion has a shape of one of a circle, an ellipse and a regular polygon.

The cross-sectional area of the stator yoke portion has a shape of one of a circle, an ellipse and a regular polygon, and the structure is relatively regular, which is easy to be processed and formed, is suitable for mass production, and helps to improve the aesthetic appearance of the product.

In the above embodiment, the material of the stator yoke portion comprises at least one of soft magnetic materials or solid materials, and the material of the stator tooth comprises at least one of soft magnetic materials or solid materials.

Both the material of the stator yoke portion and the material of the stator tooth may be one or a combination of soft magnetic materials or solid materials. For example, at least one of a silicon steel sheet made of solid steel and a powder formed of a soft magnetic material may be selected for the two structures, for example, a silicon steel sheet is used for the stator yoke portion and a soft magnetic powder is used for the stator tooth, or a soft magnetic powder is used for the stator yoke portion, a silicon steel sheet is used for the stator yoke portion, or any other combination form is also applicable.

A embodiment of the second aspect of the present disclosure provides a motor, comprising: at least one stator assembly according to any one of the embodiments of the first aspect, and at least one rotor arranged to correspond to the stator assembly.

The motor provided by the embodiment of the second aspect of the present disclosure comprises the stator assembly according to any one of the embodiments of the first aspect, and therefore has all the beneficial effects of any one of the above embodiments, which will not be repeated here.

It should be noted that the types of motors include, but are not limited to, single-stator double-rotor motors, single-rotor double-stator motors, double-stator double-rotor motors, and single-stator single-rotor motors. Both the number of the stator assemblies and the number of the rotors maybe one or more.

Here, the rotor can be a permanent magnet rotor, a squirrel cage rotor or a salient pole rotor. In particular, when the rotor is a permanent magnet rotor, the permanent magnet rotor may also be a radial flux rotor or an axial flux rotor. The magnetic steel structure of the permanent magnet rotor may be a surface-mounted type or an embedded type, and may also be in the form of a Halbach array.

In the above embodiment, the number of the stator assemblies is a first number, the number of the rotors is a second number, the first number is smaller than the second number, each of the stator assemblies is arranged between any two adjacent rotors; or the first number is greater than the second number, and each of the rotors is arranged between any two adjacent stator assemblies.

The number of the stator assemblies is set to a first number, the number of the rotors is set to a second number, and the first number is smaller than the second number, i.e., the number of the stator assemblies is smaller than the number of the rotors; moreover, the stator assembly is arranged between any two adjacent rotors, and any two adjacent rotors share one stator assembly, which makes the structure relatively regular, helps to simplify the structure of the product, and facilitates the assembly of the rotor and the stator assembly.

Alternatively, the number of the stator assemblies is greater than the number of the rotors, and each of the rotors is arranged between any two adjacent stator assemblies, i.e., any two adjacent stator assemblies share one rotor, which makes the structure relatively regular, helps to simplify the structure of the product, and facilitates the assembly of the rotor and the stator assembly.

It will be appreciated that when the number of the rotors is greater than the number of the stator assemblies, in particular, when the second number is N+1 and the first number is N, the N+1 rotors maybe spaced apart, and then the N stator assemblies may be respectively inserted between two adjacent rotors to form a motor.

Alternatively, when the number of the stator assemblies is greater than the number of the rotors, in particular, when the second number is N and the first number is N+1, the N+1 stator assemblies may be spaced apart, and then the N rotors may be respectively inserted between two adjacent stator assemblies to form a motor.

In the above embodiment, the number of the stator assemblies is at least two, and the at least two stator assemblies have the same number of stator teeth, or the at least two stator assemblies have the same number of phases.

The number of the stator assemblies is at least two, and the at least two stator assemblies have the same number of stator teeth, facilitating the assembly of the stator teeth and the stator yoke portion; or the at least two stator assemblies have the same number of phases, i.e., each of the stator assemblies have the same number of windings so that each stator assembly have the same power level.

In the above embodiment, the number of the stator assemblies is at least two, and the at least two stator assemblies have different numbers of stator teeth, or the at least two stator assemblies have different numbers of phases.

The number of the stator assemblies is at least two, and the at least two stator assemblies have different numbers of stator teeth, or the at least two stator assemblies have different numbers of phases, i.e., each of the stator assemblies has a different number of windings, and in this way, the user may set reasonable windings on each of the stator assemblies so as to meet actual power requirements.

In the above embodiment, the number of the rotors is plural, and rotation shafts of at least two of the rotors are coaxial, parallel or perpendicular.

The number of the rotors is set to be plural, and the rotation shafts of at least two rotors may be arranged coaxially, in parallel or perpendicularly. There are multiple arrangements, and the installation is relatively flexible.

At least two of the rotors have different numbers of pole pairs, or at least two of the rotors have the same number of pole pairs.

The number of the rotors is plural, and at least two rotors may be provided with the same number of pole pairs, or may be provided with different numbers of pole pairs, so as to meet the requirements of different working conditions.

Additional aspects and advantages of the present disclosure will become apparent in the following description or will be learned by practice of the present disclosure.

BRIEF DESCRIPTION OF THE DRAWINGS

The above and/or additional aspects and advantages of the present disclosure will become apparent and readily understood from the description of embodiments in conjunction with the following drawings, in which.

The corresponding relationship between the reference signs and component names in FIG. 1 to FIG. 17 is as follows:

1 stator core, 11 stator yoke portion, 111 stator yoke groove, 12 stator tooth, 121 stator tooth body, 1211 mating groove, 122 stator tooth shoe, 1221 mating convex rib, 123 positioning convex rib, 13 second stator tooth, 131 second stator tooth body, 132 second stator tooth shoe, 2 stator, 21 first winding, 22 second winding, 31 first rotor, 311 first magnetic steel, 312 first rotor yoke, 32 second rotor, 321 second magnetic steel, and 322 second rotor yoke.

DETAILED DESCRIPTION OF THE DISCLOSURE

In order that the above-mentioned objectives, features and advantages of the present disclosure can be understood more clearly, a further detailed description of the present disclosure will be given below in connection with the accompanying drawings and specific embodiments. It should be noted that the embodiments of the present disclosure and the features in the embodiments can be combined with each other if there is no conflict.

In the following description, numerous specific details are set forth in order to provide a thorough understanding of the present disclosure. However, the present disclosure can also be implemented in other manners than those described herein. Therefore, the protection scope of the present disclosure is not limited to the specific embodiments disclosed below.

A stator assembly and a motor according to some embodiments of the present disclosure are described below with reference to FIG. 1 to FIG. 17.

Figure 1:
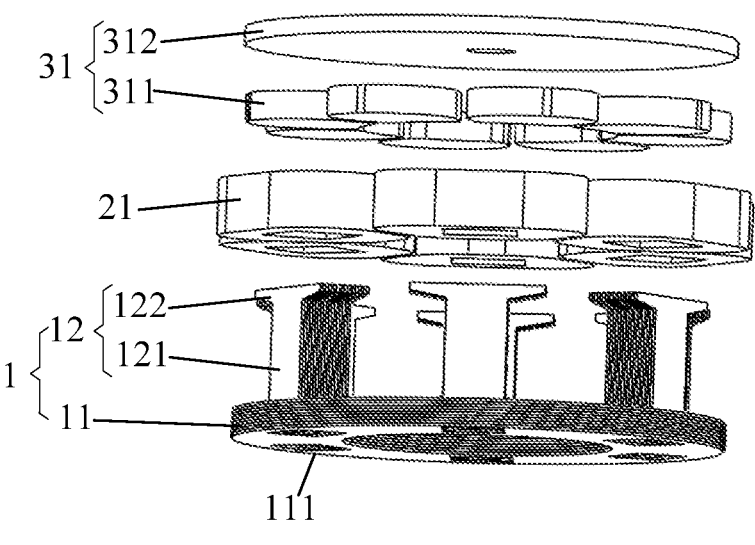
FIG. 1 is a schematic diagram of an assembly structure of a motor according to a first embodiment of the present disclosure.
Figure 2:
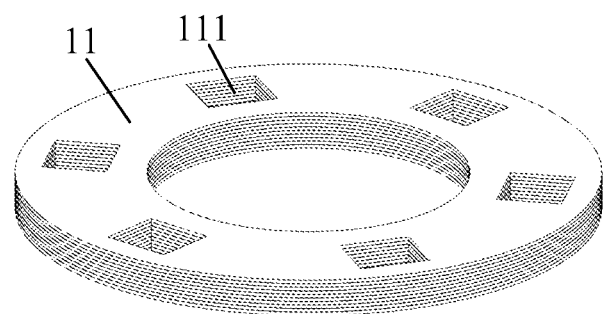
FIG. 2 is a schematic structural diagram of a stator yoke portion according to an embodiment of the present disclosure.
Figure 3:
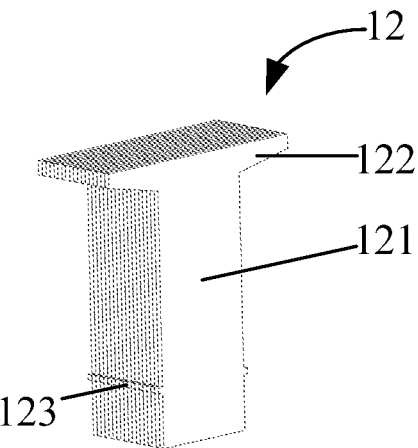
FIG. 3 is a schematic structural diagram of a stator tooth according to an embodiment of the present disclosure.

As shown in FIG. 1 to FIG. 3, the stator assembly provided by an embodiment of the first aspect of the present disclosure comprises a stator core 1 and at least one winding. The stator core 1 comprises a stator yoke portion 11 and at least one stator tooth 12. Each stator tooth 12 is disposed in an axial direction of the stator yoke portion 11, and the stator tooth 12 is detachably connected to the stator yoke portion 11. The at least one winding is wound on the at least one stator tooth 12 and abuts against the stator yoke portion 11. The stator yoke portion 11 is provided with a stator yoke groove 111 and/or a stator protrusion adapted to the shape of the stator tooth 12, and the stator tooth 12 passes through the stator yoke groove 111 and/or the stator protrusion to form the stator core 1.

The stator assembly provided by an embodiment of the present disclosure comprises a stator core 1 and at least one winding. The stator core 1 comprises a stator yoke portion 11 and at least one stator tooth 12. That is, the number of the at least one stator tooth 12 and the number of the windings may both be one or more. When there are a plurality of stator teeth 12, by disposing each of the stator teeth 12 in the axial direction of the stator yoke portion 11 and detachably connecting each of the stator teeth 12 to the stator yoke portion 11, the winding is not limited by the shape of the stator core 1 when wound, and each of the stator teeth 12 can be connected to the stator yoke portion 11 after the winding has been wound. The winding mode is flexible and adaptable, and the winding efficiency of the winding is improved. In addition, by reasonably arranging the size of the stator teeth 12 or the spacing between the stator teeth 12 so as to adjust the size of the winding grooves, the number of the windings can be flexibly and adaptively set, such that the power level of the stator core 1 can be reasonably adjusted, which solves the problem that the power level of the stator core 1 is limited due to the single size of the winding grooves. Moreover, at the time of assembling the stator teeth 12 and the stator yoke portion 11, each of the stator teeth 12 is directly passed through a stator yoke groove 111 adapted to the shape of the stator tooth 12 or inserted into the stator protrusion adapted to the stator tooth 12, or part of the stator teeth 12 are passed through the stator yoke groove 111 and the remaining stator teeth 12 are inserted into the stator protrusion, which can achieve quick assembly of the stator teeth 12 and the stator yoke portion 11, and effectively improves the assembling efficiency of the stator teeth 12 and the stator yoke portion 11.

Materials of the stator tooth 12 and the stator yoke portion 11 are optionally magnetically conductive materials, such as silicon steel sheets, soft magnetic materials, or solid steel, which all can achieve the objects of the present disclosure, and therefore should all be within the protection scope of the present disclosure.

The specific structure of the stator assembly provided by the present disclosure is described in detail below in connection with some embodiments.

First Embodiment

The stator yoke portion 11 comprises: a plurality of first magnetically conductive sheets stacked in a radial direction or an axial direction of the stator core 1, as shown in FIG. 2.

The stator yoke portion 11 comprises a plurality of first magnetically conductive sheets, and by stacking the plurality of first magnetically conductive sheets in the radial direction or the axial direction of the stator core 1, the magnetic conductivity of the stator core 1 is improved.

Optionally, the stator yoke groove 111 at least passes through one end surface of the stator yoke portion 11 in the axial direction.

That is, the stator yoke groove 111 may pass through one end surface of the stator yoke portion 11 in the axial direction, and may also pass through two end surfaces of the stator yoke portion 11 in the axial direction. That is, the stator tooth 12 may be inserted in a stator yoke groove 111 passing through one end surface of the stator yoke portion 11, and may also be inserted in a stator yoke groove 111 passing through two end surfaces of the stator yoke portion 11, so that the stator tooth 12 and the stator yoke portion 11 can be connected in various ways, and the winding can be assembled in a relatively flexible and adaptable way, so as to meet the different requirements of the users.

Optionally, the stator yoke groove 111 is spaced apart from an outer circumferential surface of the stator yoke portion 11 in the radial direction, and the stator yoke groove

111 is spaced apart from an inner circumferential surface of the stator yoke portion 11 in the radial direction, as shown in FIG. 2.

The stator yoke groove 111 is spaced apart from the outer circumferential surface of the stator yoke portion 11 in the radial direction. In other words, the stator yoke groove 111 passes through the stator yoke portion 11 and does not communicate with the outer circumferential surface of the stator yoke portion 11. Subsequently, the stator tooth 12 is inserted into the stator yoke groove 111 in the axial direction of the stator yoke portion 11 to be connected with the stator yoke portion 11. As a result, the stator tooth 12 is prevented from being separated from the stator yoke portion 11 from the stator yoke groove 111 along the outer circumferential surface of the stator yoke portion 11, and connection reliability between the stator tooth 12 and the stator yoke portion 11 is improved.

Alternatively, the stator yoke groove 111 communicates with the outer circumferential surface and the inner circumferential surface of the stator yoke portion at the same time. In such a case, the stator tooth can be inserted into the stator yoke groove from the outer circumferential surface in the axial direction or the radial direction to form a complete stator core.

Second Embodiment

Figure 12:
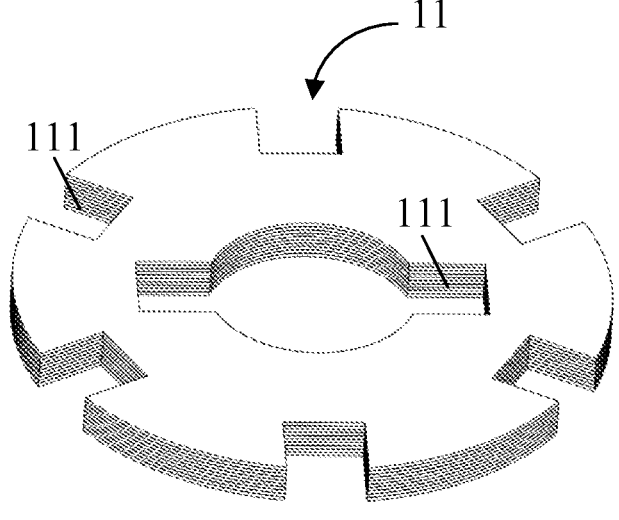
FIG. 12 is a schematic structural diagram of a stator yoke portion of the motor shown in FIG. 11.

This embodiment is distinguished from the first embodiment in that the stator yoke groove 111 communicates with the outer circumferential surface of the stator yoke portion 11, as shown in FIG. 12.

The stator yoke groove 111 communicates with the outer circumferential surface of the stator yoke portion 11, then the stator tooth 12 can be inserted into the stator yoke groove 111 from the outer circumferential surface of the stator yoke portion 11. The connection mode is flexible and adaptable, which facilitates the assembly between the stator tooth 12 and the stator yoke portion 11.

When the stator yoke portion 11 shown in FIG. 12 is used, two disk rotors may be arranged on the same side of the stator yoke portion 11, or rotors may be arranged on different sides of the stator yoke portion 11, i.e., each side is provided with one rotor, which may be a disk rotor or may be a radial rotor.

Third Embodiment

Figure 5:
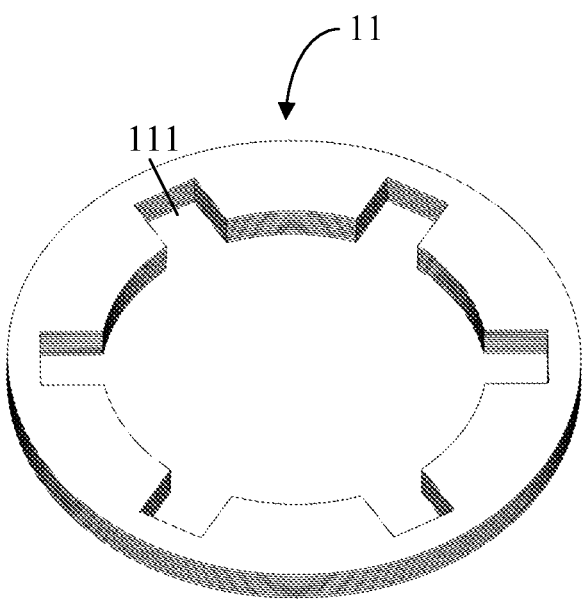
FIG. 5 is a schematic structural diagram of a stator yoke portion according to another embodiment of the present disclosure.

This embodiment is distinguished from the second embodiment in that the stator yoke groove 111 communicates with the inner circumferential surface of the stator yoke portion 11, as shown in FIG. 5.

The stator yoke groove 111 communicates with the inner circumferential surface of the stator yoke portion 11, then the stator tooth 12 can be inserted into the stator yoke groove 111 from the inner circumferential surface of the stator yoke portion 11. The connection mode is flexible and adaptable, which facilitates the assembly between the stator tooth 12 and the stator yoke portion 11.

Optionally, the stator tooth 12 comprises a stator tooth body 121 and a stator tooth shoe 122. The stator tooth body 121 comprises a plurality of second magnetically conductive sheets, the plurality of second magnetically conductive sheets being stacked in the radial direction or the circumferential direction of the stator core 1. The stator tooth shoe 122 is disposed at an end portion of the stator tooth body 121 and detachably connected with the stator tooth body 121. The stacking direction of the second magnetically conductive sheets is perpendicular to the stacking direction of the first magnetically conductive sheets, as shown in FIG. 1 and FIG. 3.

The stator tooth 12 comprises a stator tooth body 121 and a stator tooth shoe 122. The stator tooth body 121 comprises a plurality of second magnetically conductive sheets, and by stacking the plurality of second magnetically conductive sheets in the radial direction or the circumferential direction of the stator core 1, the magnetic conductivity of the stator core 1 is improved. The stator tooth shoe 122 is disposed at an end portion of the stator tooth body 121, and by detachably connecting the stator tooth shoe 122 with the stator tooth body 121, the stator tooth shoe 122 is connected with the stator tooth body 121 after the winding has been wound on the stator tooth body 121, which serves the function of fixing the winding to prevent the winding from being separated from the stator tooth body 121, and further improves the assembly efficiency of the winding and the stator tooth 12.

It is worth noting that the materials of the stator tooth body and the stator tooth shoe may be the same or different.

Fourth Embodiment

This embodiment is distinguished from any of the first to third embodiments in that the stator tooth shoe 122 and the stator tooth body 121 are integrally formed, as shown in FIG. 3.

The stator tooth shoe 122 and the stator tooth body 121 are integrally formed, which simplifies the structure of the product, achieves better integrity of the product, omits the step of connecting the stator tooth shoe 122 and the stator tooth body 121, and further improves the assembly efficiency of the product.

Optionally, the number of the stator tooth shoes 122 is one, and the stator tooth shoe 122 is disposed at one end of the stator tooth body 121, as shown in FIG. 1 and FIG. 3.

Fifth Embodiment

Figure 4:
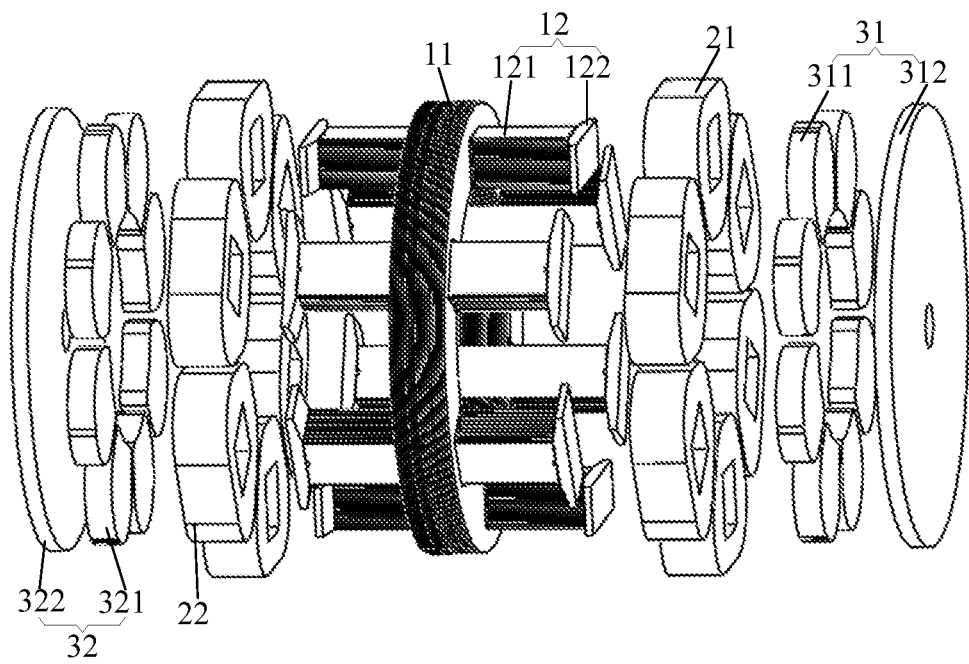
FIG. 4 is a schematic diagram of an assembly structure of a motor according to a second embodiment of the present disclosure.

This embodiment is distinguished from the fourth embodiment in that the number of the stator tooth shoes 122 is two, and the two ends of the stator tooth body 121 are provided with one stator tooth shoe 122 respectively, as shown in FIG. 4.

Optionally, the stator assembly further comprises a positioning groove and a positioning convex rib 123 having mated shapes. One of the positioning groove and the positioning convex rib 123 is disposed on the stator tooth 12, and the other is disposed on the stator yoke groove 111 and/or the stator protrusion, so as to limit the position of the stator tooth 12 in the stator yoke portion 11, as shown in FIG. 3.

By arranging a positioning convex rib 123 on the stator tooth body 121 and arranging a positioning groove on the stator yoke groove 111 or the stator protrusion, or arranging a positioning groove on both the stator yoke groove 111 and the stator protrusion, at the time of assembling the stator tooth 12 and the stator yoke portion 11, the positioning convex rib 123 is inserted into the positioning groove to serve the function of position limiting, thereby preventing relative movement between the stator tooth 12 and the stator yoke groove 111, and further improving the stability of the connection between the stator tooth 12 and the stator yoke groove.

Similarly, it is also feasible to arrange a positioning groove on the stator tooth body 121, arrange a positioning convex rib 123 on the stator yoke groove 111 or the stator protrusion, or arrange a positioning convex rib 123 on both the stator yoke groove 111 and the stator protrusion. At the time of assembling the stator tooth 12 and the stator yoke portion 11, the positioning convex rib 123 is inserted into the positioning groove to serve the function of position limiting, thereby preventing relative movement between the stator tooth 12 and the stator yoke portion 11, and further improving the stability of the connection between the stator tooth 12 and the stator yoke portion 11.

Figures 6, 7:
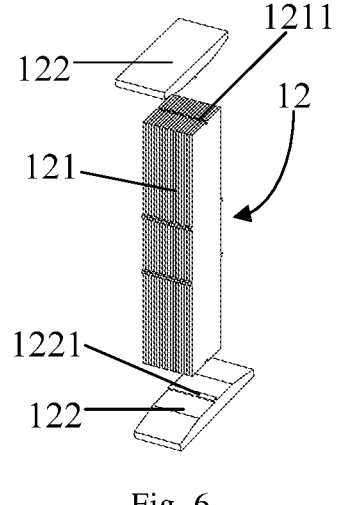
FIG. 6 is a schematic structural diagram of a stator tooth according to another embodiment of the present disclosure.
FIG. 7 is a schematic diagram of an assembly structure of a motor according to the second embodiment of the present disclosure.

Optionally, the stator assembly further comprises: a mating groove 1211 and a mating convex rib 1221 having mated shapes, wherein one of the mating groove 1211 and the mating convex rib 1221 is disposed on the stator tooth body 121, and the other is disposed on the stator tooth shoe 122, so as to realize the connection between the stator tooth shoe 122 and the stator tooth body 121 through the mating between the mating groove 1211 and the mating convex rib 1221, as shown in FIG. 6.

By arranging a mating convex rib 1221 on the stator tooth body 121 and arranging a mating groove 1211 on the stator tooth shoe 122, at the time of assembling the stator tooth shoe 122 and the stator tooth body 121, the mating convex rib 1221 is directly inserted into the mating groove 1211 to limit the relative movement between the stator tooth shoe 122 and the stator tooth body 121, which improves the assembly efficiency of the stator tooth shoe 122 and the stator tooth body 121, and improves the stability of the connection between the stator tooth shoe 122 and the stator tooth body 121.

Optionally, the number of the stator yoke grooves 111 is plural, and the plurality of stator yoke grooves 111 are uniformly arranged on the stator yoke portion 11 around the axis of the stator core 1, as shown in FIG. 1, FIG. 2, FIG. 3, FIG. 5, FIG. 7, FIG. 8, FIG. 9, FIG. 10, FIG. 11 and FIG. 12.

The number of the stator yoke grooves 111 is plural, and by uniformly arranging the plurality of stator yoke grooves 111 on the stator yoke portion 11 around the axis of the stator core 1, the structure of the product is more regular, and the number of the stator yoke grooves 111 is increased; and correspondingly, the number of the stator teeth 12 is also plural, and the plurality of stator teeth 12 are inserted into the corresponding plurality of stator yoke grooves 111, thereby increasing the number of the windings, thus contributing to the improvement of the power level of the stator core 1.

Optionally, a cross-sectional area of the stator yoke portion 11 has a shape of one of a circle, an ellipse and a regular polygon.

The cross-sectional area of the stator yoke portion 11 has a shape of one of a circle, an ellipse and a regular polygon, and the structure is relatively regular, which is easy to be processed and formed, is suitable for mass production, and helps to improve the aesthetic appearance of the product.

Figure 16:
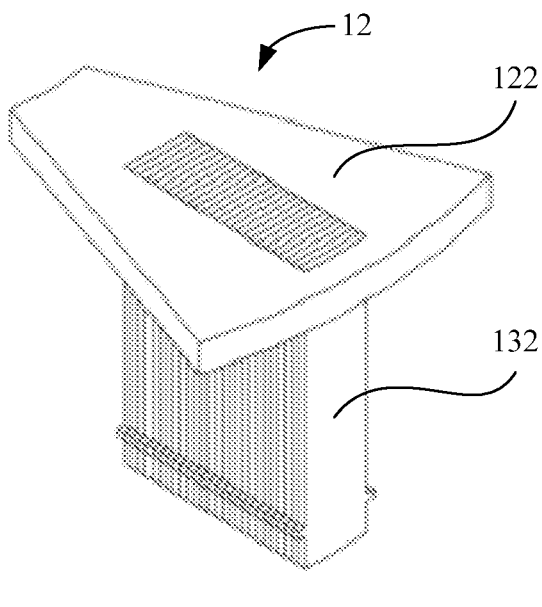
FIG. 16 is a schematic diagram of an assembly structure of a stator tooth according to an embodiment of the present disclosure.
Figure 17:
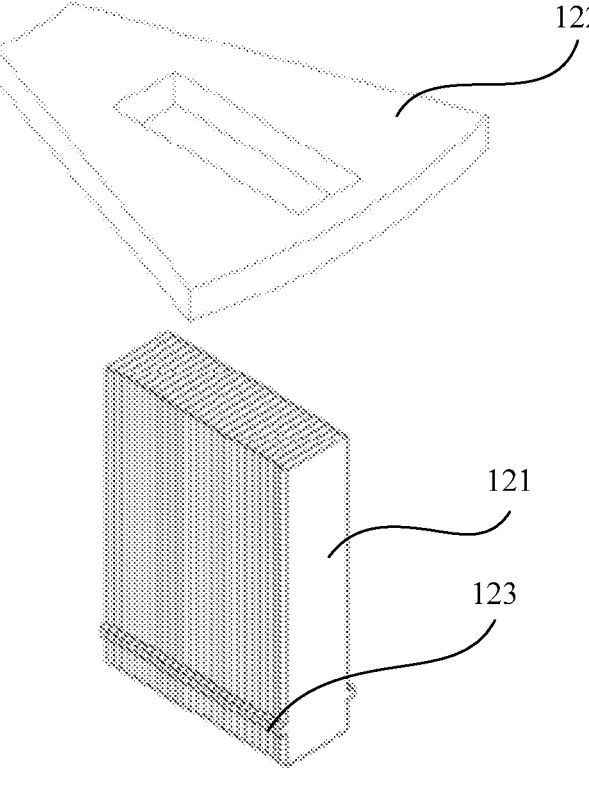
FIG. 17 is a schematic diagram of a detached structure of the stator tooth shown in FIG. 16.

In another embodiment, as shown in FIG. 16 and FIG. 17, the stator tooth body 121 has a straight tooth shape, the stator tooth body 121 is provided with a positioning convex rib 123, and the stator tooth body 121 is not provided with a mating convex rib or a mating groove mated with the stator tooth shoe 122, the stator tooth shoe 122 is directly sleeved on one end of the stator tooth body 121, and the position at which the stator tooth shoe and the stator tooth body are mated limits the mating degree of parallelity between the upper end surfaces of the stator tooth shoe and the stator tooth body.

Another embodiment of the present disclosure provides a motor, comprising: at least one stator assembly according to any one of the above embodiments, and at least one rotor arranged to correspond to the stator assembly.

The motor provided by an embodiment of the second aspect of the present disclosure comprises at least one stator assembly according to any one of the embodiments of the first aspect and a rotor arranged to correspond to the stator assembly, and therefore has all the beneficial effects of any of the above embodiments, which will not be repeated here.

Optionally, the number of the stator assemblies is a first number, the number of the rotors is a second number, the first number is smaller than the second number, each of the stator assemblies is arranged between any two adjacent rotors; or the first number is greater than the second number, and each rotor is arranged between any two adjacent stator assemblies.

The number of the stator assemblies is set to a first number, the number of rotors is set to a second number, and the first number is smaller than the second number, i.e., the number of the stator assemblies is smaller than the number of the rotors; moreover, the stator assembly is arranged between any two adjacent rotors, and any two adjacent rotors share one stator assembly, which makes the structure relatively regular, helps to simplify the structure of the product, and facilitates the assembly of the rotor and the stator assembly.

Alternatively, the number of the stator assemblies is greater than the number of the rotors, and each of the rotors is arranged between any two adjacent stator assemblies, i.e., any two adjacent stator assemblies share one rotor, which also makes the structure relatively regular, helps to simplify the structure of the product, and facilitates the assembly of the rotor and the stator assembly.

Optionally, the number of the stator assemblies is at least two, and the at least two stator assemblies have the same number of stator teeth, or the at least two stator assemblies have the same number of phases.

The number of the stator assemblies is at least two, and the at least two stator assemblies have the same number of stator teeth, facilitating the assembly of the stator teeth and the stator yoke portion; or the at least two stator assemblies have the same number of phases, i.e., each of the stator assemblies have the same number of windings so that each of the stator assemblies have the same power level.

Optionally, the number of the stator assemblies is at least two, and the at least two stator assemblies have the same number of stator teeth, or the at least two stator assemblies have different numbers of phases.

The number of the stator assemblies is at least two, and the at least two stator assemblies have different numbers of stator teeth, or the at least two stator assemblies have different numbers of phases, i.e., each of the stator assemblies has a different number of windings, and in this way, the user may set reasonable windings on each of the stator assemblies so as to meet actual power requirements.

Optionally, the number of the rotors is plural, and rotation shafts of at least two of the rotors are coaxial, parallel or perpendicular.

The number of the rotors is set to be plural, and the rotation shafts of at least two rotors may be arranged coaxially, in parallel or perpendicularly. There are multiple arrangements, and the installation is relatively flexible and adaptable.

Optionally, the number of the rotors is plural, at least two of the rotors have the same number of pole pairs, or at least two of the rotors have different numbers of pole pairs.

The number of the rotors is plural, and at least two rotors may be provided with the same number of pole pairs, or may be provided with different numbers of pole pairs, so as to meet the requirements of different working conditions.

Specific structures of the stator assembly and the motor provided by the present disclosure are described in detail below with reference to some specific embodiments.

First Embodiment

As shown in FIG. 1, the present disclosure provides a single-stator single-rotor motor. The single-stator single-rotor motor comprises a stator assembly and a first rotor 31. The stator assembly comprises a stator core 1. The stator core 1 comprises a stator yoke portion 11 and one or more stator teeth 12, each of the stator teeth 12 being disposed in an axial direction of the stator yoke portion 11, and each of the stator teeth 12 being detachably connected to the stator yoke portion 11. The stator assembly further comprises a first winding 21 wound on the one or more stator teeth 12 and abutting against the stator yoke portion 11. The stator yoke portion 11 is provided with a stator yoke groove 111 adapted to the shape of the one or more stator teeth 12, and each of the stator teeth 12 passes through the stator yoke groove 111 to form the stator core 1. The first rotor 31 comprises a first magnetic steel 311 and a first rotor yoke 312 arranged to correspond to the stator assembly.

Second Embodiment

This embodiment is distinguished from the first embodiment in the followings aspects. A double-stator double-rotor motor is provided according to this embodiment. The double-stator double-rotor motor comprises a stator assembly, a first rotor 31 and a second rotor 32. The stator assembly comprises a stator core and the first rotor 31 and the second rotor 32 located on the two sides of the stator core. The stator core comprises a stator yoke portion, a plurality of stator teeth and a plurality of second stator teeth 13 (comprising second stator tooth bodies 131 and second stator tooth shoes 132). The stator yoke portion is provided with stator yoke grooves, the plurality of stator teeth and the plurality of second stator teeth 13 being asymmetrically disposed on the two sides of the stator yoke portion. The plurality of stator teeth and the plurality of second stator teeth 13 are respectively inserted in the stator yoke grooves to form the stator core. The stator assembly further comprises a first winding 21 and a second winding 22 respectively wound on the plurality of stator teeth and the plurality of second stator teeth 13. The first rotor 31 (comprising a first magnetic steel 311 and a first rotor yoke 312) and the second rotor 32 (comprising a second magnetic steel 321 and a second rotor yoke 322) are respectively arranged to correspond to the stator assembly, as shown in FIG. 7.

Third Embodiment

Figure 8:
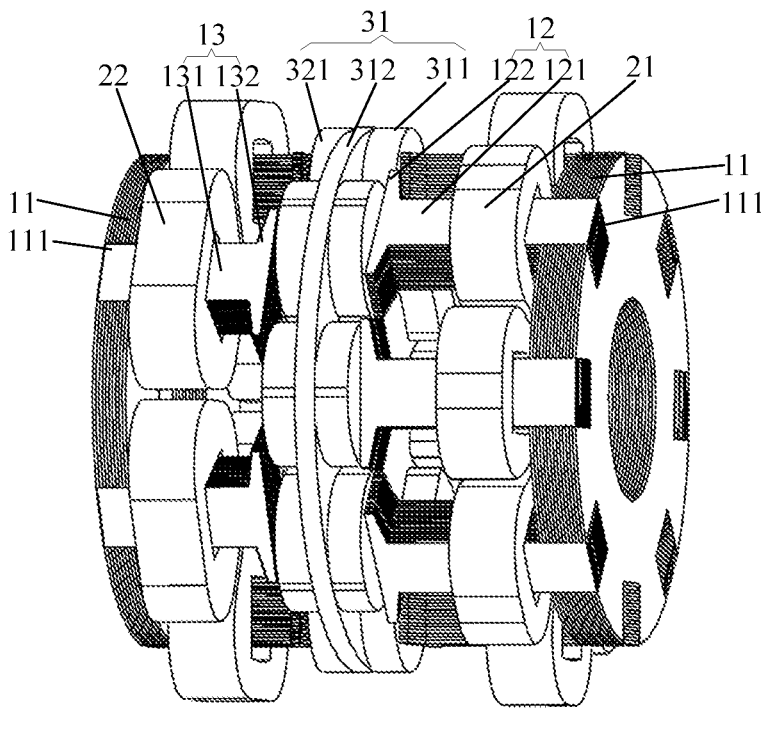
FIG. 8 is a schematic diagram of an assembly structure of a motor according to a third embodiment of the present disclosure.

This embodiment is distinguished from the first embodiment and the second embodiment in the following aspects. A double-stator single-rotor motor is provided according to this embodiment. The double-stator single-rotor motor comprises a stator assembly and a first rotor 31. The stator assembly comprises a first stator core and a second stator core, the first stator core and the second stator core being symmetrically distributed on the two sides of the first rotor 31, as shown in FIG. 8.

Fourth Embodiment

Figure 9:
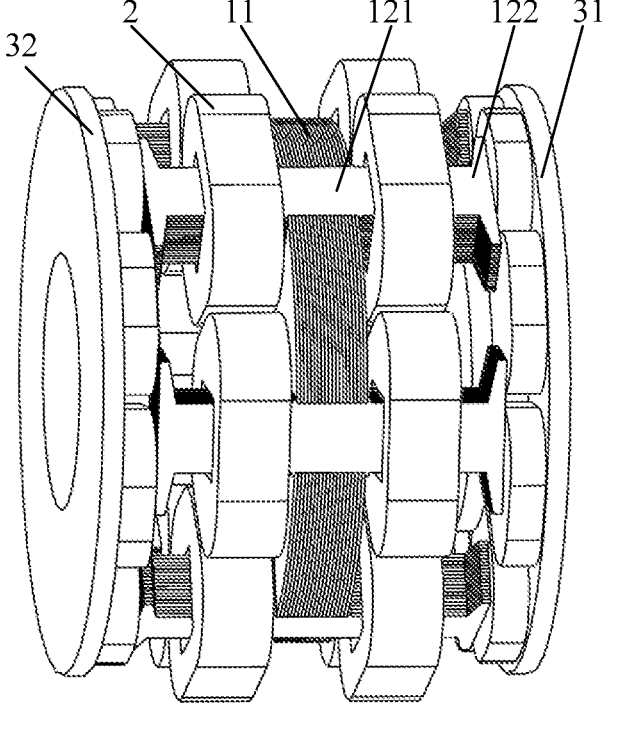
FIG. 9 is a schematic diagram of an assembly structure of a motor according to a fourth embodiment of the present disclosure.
Figure 10:
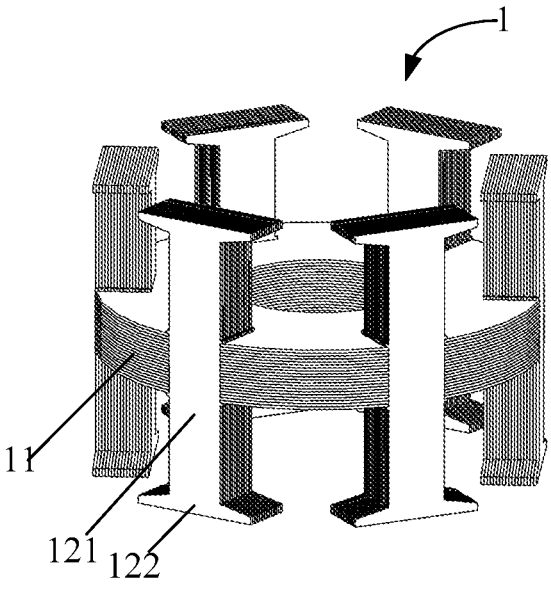
FIG. 10 is a schematic structural diagram of a stator core of the motor shown in FIG. 9.

This embodiment is distinguished from the third embodiment in the following aspects. A single-stator double-rotor motor is provided according to this embodiment. As shown in FIG. 9, the single-stator double-rotor motor comprises a stator assembly, a first rotor 31 and a second rotor 32; the stator assembly comprises a stator core 1; and the two rotors (i.e., the first rotor 31 and the second rotor 32) are respectively disposed on the two sides of the stator core 1. The stator core 1 is as shown in FIG. 10, which comprises a stator yoke portion 11 and a plurality of stator teeth 12 which pass through the stator yoke portion 11 and can be wound with windings on both sides, each of the stator teeth comprising a stator tooth body 121 and a stator tooth shoe 122 disposed on the two ends of the stator tooth body.

Fifth Embodiment

Figure 11:
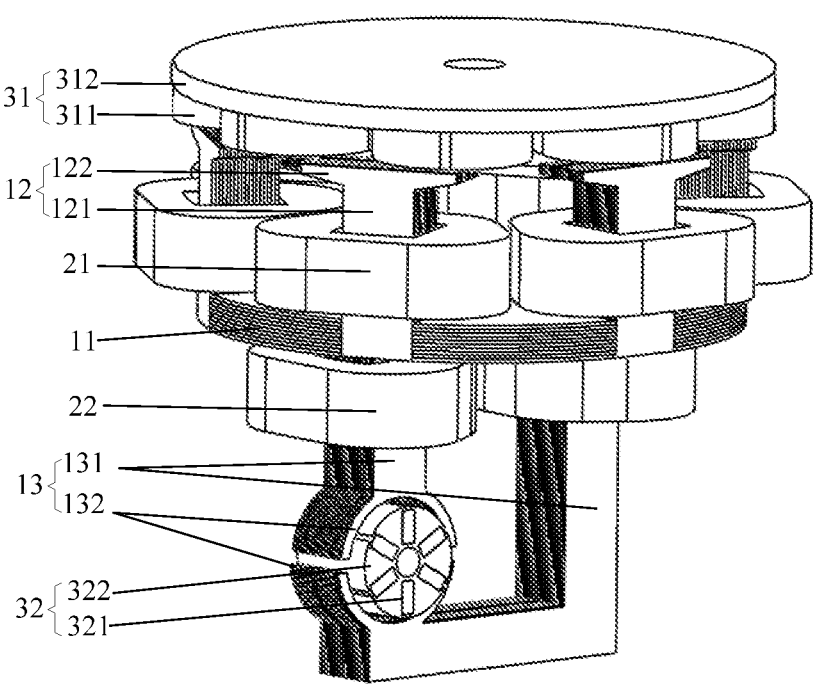
FIG. 11 is a schematic diagram of an assembly structure of a motor according to a fifth embodiment of the present disclosure.
Figure 13:
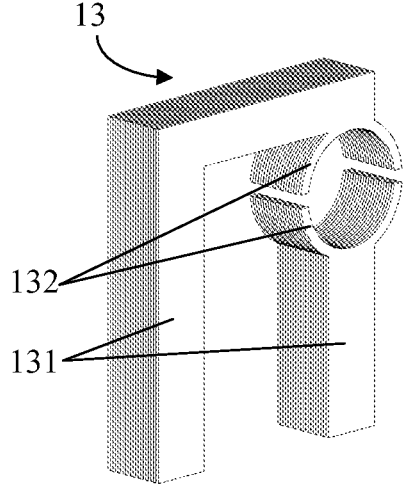
FIG. 13 is a schematic structural diagram of a stator tooth of the motor shown in FIG. 11.

This embodiment is distinguished from the fourth embodiment in the following aspects. A single-stator double-rotor motor, as shown in FIG. 11, is provided according to this embodiment. The single-stator double-rotor motor comprises a stator assembly and two rotors (i.e., a first rotor 31 and a second rotor 32). The stator assembly comprises a plurality of stator teeth 12 and two second stator teeth 13 (comprising second stator tooth bodies 131 and second stator tooth shoes 132), as shown in FIG. 13, the two second stator teeth 13 being combined to form a U-shape, and the second rotor 32 being disposed between the two second stator teeth 13.

As shown in FIG. 12, the stator yoke portion 11 is provided with two types of stator yoke grooves 111, one type of stator yoke grooves 111 communicating with the outer circumferential surface of the stator yoke portion 11, and the other type of stator yoke grooves 111 communicating with the inner circumferential surface of the stator yoke portion 11.

Sixth Embodiment

Figure 14:
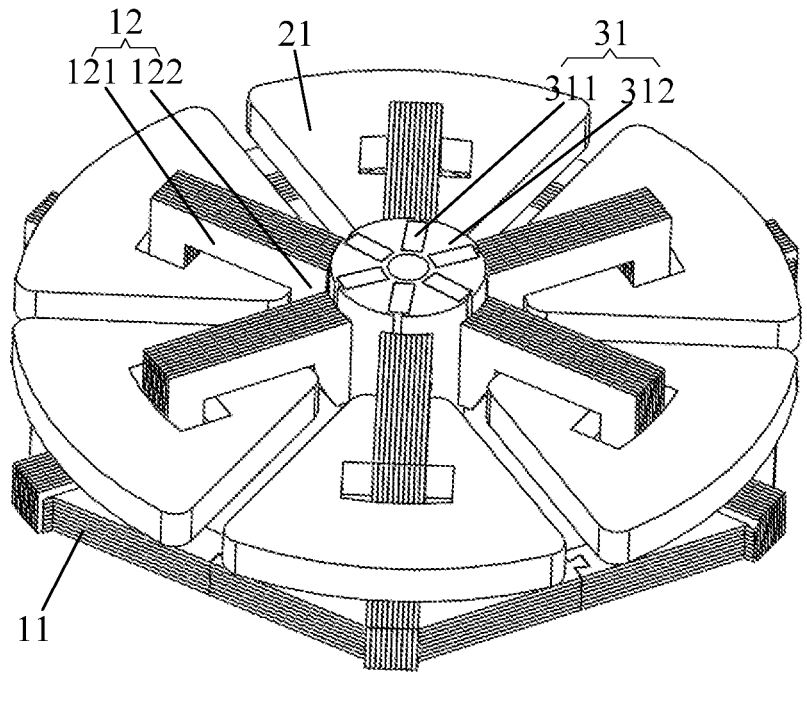
FIG. 14 is a schematic diagram of an assembly structure of a motor according to a sixth embodiment of the present disclosure.
Figure 15:
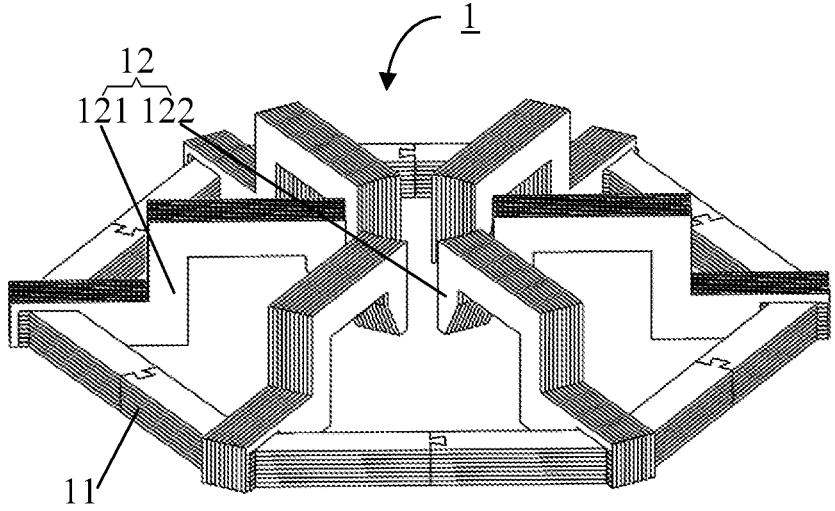
FIG. 15 is a schematic structural diagram of a stator core of the motor shown in FIG. 14.

This embodiment is distinguished from the fifth embodiment in the following aspects. A single-stator single-rotor motor is provided according to this embodiment, as shown in FIG. 14 and FIG. 15. The single-stator single-rotor motor comprises a stator assembly and a first rotor 31. The first rotor 31 comprises a first magnetic steel 311 and a first rotor yoke 312. The stator assembly comprises a plurality of stator teeth 12, a stator yoke portion 11 and a plurality of windings 21. The plurality of stator teeth 12 each have a spoon shape and define a receiving space for disposing the first rotor 31. The stator yoke portion 11 has a circular shape. The plurality of stator teeth 12 is arranged in the circumferential direction of the stator yoke portion 11. The plurality of windings 21 is correspondingly wound on the plurality of stator teeth 12. The first rotor 31 is arranged in the receiving cavity.

In summary, for the stator assembly provide by the present disclosure, by disposing each of the stator teeth in the axial direction of the stator yoke portion and detachably connecting each of the stator teeth to the stator yoke portion, the winding is not limited by the shape of the stator core when wound, and each of the stator teeth can be connected to the stator yoke portion after the winding has been wound. The winding mode is flexible and adaptable, and the winding efficiency of the winding is improved. In addition, by reasonably arranging the size of the stator teeth or the spacing between the stator teeth so as to adjust the size of the winding grooves, the number of the windings can be flexibly and adaptively set, such that the power level of the stator core can be reasonably adjusted, which solves the problem in the prior art that the power level of the stator core is limited due to the single size of the winding grooves.

In the present disclosure, the terms "first", "second" and "third" are used for the purpose of description only, and cannot be understood as indicating or implying relative importance; the term "a plurality of" means two or more, unless otherwise explicitly defined; and the terms "mounting", "connected", "connection", "fixing" and the like should all be understood in a broad sense, for example, "connection" may be a fixed connection, and may also be a removable connection, or an integral connection; and "connected" may refer to direct connection and may also refer to indirect connection through an intermediary. A person of ordinary skills in the art could understand the specific meaning of the terms in the present disclosure according to specific situations.

In the description of the present disclosure, it should be understood that the orientation or position relationships indicated by the terms "upper", "lower", "left", "right", "front", "back" and the like are the orientation or position relationships based on what is shown in the drawings, are merely for the convenience of describing the present disclosure and simplifying the description, and do not indicate or imply that the device or unit referred to must have a particular direction and is constructed and operated in a specific orientation, and thus cannot be understood as the limitation of the present disclosure.

In the description of the present specification, the descriptions of the terms "one embodiment", "some embodiments" and "specific embodiments" and the like mean that specific features, structures, materials or characteristics described in conjunction with the embodiment(s) or example(s) are included in at least one embodiment or example of the present disclosure. In the specification, the schematic representation of the above terms does not necessarily refer to the same embodiment or example. Moreover, the particular features, structures, materials or characteristics described may be combined in a suitable manner in any one or more embodiments or examples.

The descriptions above are only preferred embodiments of the present disclosure, which are not used to limit the present disclosure. For a person skilled in the art, the present disclosure may have various changes and variations. Any modifications, equivalent substitutions, improvements etc. within the spirit and principle of the present disclosure shall all be included in the protection scope of the present disclosure.

What is claimed is:

1. A stator assembly comprising:

a stator core comprising:

a stator yoke portion; and at least one stator tooth comprising at least one stator tooth shoe and a stator tooth body, the stator tooth body comprising a first end and a second end, wherein the stator tooth body extends in an axial direction of the stator yoke portion between the first end and the second end, and each of the at least one stator tooth is detachably connected to the stator yoke portion at the first end of the stator tooth body, wherein the stator tooth shoe is detachably connected to the second end of the stator tooth body, and wherein a positioning convex rib is disposed on an outer side of the at least one stator tooth between the stator tooth shoe and the stator yoke portion in the axial direction of the stator yoke portion when the first end of the stator tooth body is detachably connected to the stator yoke portion and is configured to inhibit an axial translation of the second end of the stator tooth body of the at least one stator tooth toward the stator yoke portion when the first end is detachably connected to the stator yoke portion, and at least one winding wound on the at least one stator tooth, wherein the stator yoke portion is provided with a stator yoke groove and/or a stator protrusion adapted to a shape of the first end of the stator tooth body, and the at least one stator tooth is configured to detachably connect to the stator yoke portion by an insertion of the first end of the stator tooth body into the stator yoke groove and/or the stator protrusion in the axial direction to form the stator core.

2. The stator assembly according to claim 1, wherein the stator yoke portion comprises:

a plurality of first magnetically conductive sheets stacked in a radial direction or an axial direction of the stator core.

3. The stator assembly according to claim 2, wherein:

the stator yoke portion comprises the plurality of first magnetically conductive sheets stacked in the radial direction or the axial direction of the stator core; and the at least one stator tooth comprises a stator tooth body, the stator tooth body comprising a plurality of second magnetically conductive sheets stacked in the radial direction or a circumferential direction of the stator core.

4. The stator assembly according to claim 3, wherein the stacking direction of the second magnetically conductive sheets is perpendicular to the stacking direction of the first magnetically conductive sheets.

5. The stator assembly according to claim 1, wherein the stator yoke groove at least passes through one end surface of the stator yoke portion in the axial direction.

6. The stator assembly according to claim 1, wherein:

the stator yoke groove is spaced apart from an outer circumferential surface of the stator yoke portion in a radial direction of the stator core, and the stator yoke groove is spaced apart from an inner circumferential surface of the stator yoke portion in the radial direction; or the stator yoke groove communicates with the outer circumferential surface and/or the inner circumferential surface of the stator yoke portion.

7. The stator assembly according to claim 1, wherein:

the stator protrusion is formed by outwardly extending an outer circumferential surface of the stator yoke portion in a radial direction of the stator core; and/or the stator protrusion is formed by inwardly extending an inner circumferential surface of the stator yoke portion in the radial direction.

8. The stator assembly according to claim 1, wherein:

a number of the at least one stator tooth shoe is one, and the stator tooth shoe is disposed at one end of the stator tooth body; or a number of the at least one stator tooth shoe is two, and two ends of the stator tooth body are provided with one of the stator tooth shoes respectively.

9. The stator assembly according to claim 1, further comprising:

a mating groove and a mating convex rib having mated shapes, wherein one of the mating groove and the mating convex rib is disposed on the stator tooth body, and the other is disposed on the at least one stator tooth shoe, so as to realize connection between the at least one stator tooth shoe and the stator tooth body through the mating between the mating groove and the mating convex rib.

10. The stator assembly according to claim 1, wherein a number of the stator yoke groove and/or the stator protrusion is plural, and the plurality of stator yoke grooves and/or stator protrusions are uniformly arranged on the stator yoke portion around an axis of the stator core.

11. The stator assembly according to claim 1, wherein a cross-sectional area of the stator yoke portion has a shape of one of a circle, an ellipse and a regular polygon.

12. The stator assembly according to claim 1, wherein:

a material of the stator yoke portion comprises at least one of soft magnetic materials or solid steel, and a material of the at least one stator tooth comprises at least one of soft magnetic materials or solid steel.

13. A motor comprising:

at least one stator assembly according to claim 1; and at least one rotor, each of the at least one rotor being arranged to correspond to the at least one stator assembly.

14. The motor according to claim 13, wherein:

a number of the at least one stator assembly is a first number, the at least one rotor comprises a plurality of rotors, a number of the plurality of rotors is a second number, the first number is smaller than the second number, and each of the at least one stator assembly is arranged between two adjacent rotors of the plurality of rotors; or the at least one stator assembly comprises a plurality of stator assemblies, the number of the plurality of stator assemblies is a first number, the number of the at least one rotor is a second number, the first number is greater than the second number, and each of the at least one rotor is arranged between two adjacent stator assemblies of the plurality of stator assemblies.

15. The motor according to claim 13, wherein:

a number of the at least one stator assembly is at least two, and the at least two stator assemblies have the same number of stator teeth, or the at least two stator assemblies have the same number of phases; or a number of the at least one stator assembly is at least two, and the at least two stator assemblies have different numbers of stator teeth, or the at least two stator assemblies have different numbers of phases.

16. The motor according to claim 13, wherein the at least one rotor comprises a plurality of rotors, and rotation shafts of the plurality of rotors are coaxial, parallel or perpendicular.

* * * * *